United States Patent
Lenzini et al.

(10) Patent No.: US 7,764,659 B2
(45) Date of Patent: Jul. 27, 2010

(54) SCHEDULING METHOD AND APPARATUS FOR HALF-DUPLEX TRANSMISSION

(75) Inventors: Luciano Lenzini, Leghorn (IT); Enzo Mingozzi, Pisa (IT)

(73) Assignee: Nokia Corporation, Espoo (FI)

( * ) Notice: Subject to any disclaimer, the term of this patent is extended or adjusted under 35 U.S.C. 154(b) by 595 days.

(21) Appl. No.: 10/516,022

(22) PCT Filed: Jun. 27, 2002

(86) PCT No.: PCT/IB02/02419

§ 371 (c)(1),
(2), (4) Date: Nov. 29, 2004

(87) PCT Pub. No.: WO2004/004244

PCT Pub. Date: Jan. 8, 2004

(65) Prior Publication Data

US 2005/0174971 A1 Aug. 11, 2005

(51) Int. Cl.
*H04J 3/00* (2006.01)
*H04B 7/212* (2006.01)
*H04J 4/00* (2006.01)

(52) U.S. Cl. .................. 370/337; 370/336; 370/347; 370/442; 370/478

(58) Field of Classification Search ............ 370/321, 370/336, 337, 347, 58.1, 442, 478
See application file for complete search history.

(56) References Cited

U.S. PATENT DOCUMENTS

| 6,016,311 | A | * | 1/2000 | Gilbert et al. | 370/280 |
| 6,094,421 | A | * | 7/2000 | Scott | 370/280 |
| 6,967,943 | B1 | * | 11/2005 | Hamalainen et al. | 370/347 |
| 7,197,022 | B2 | * | 3/2007 | Stanwood et al. | 370/337 |

FOREIGN PATENT DOCUMENTS

| WO | WO 02/39774 A1 | 5/2002 |
| WO | WO 02/41520 A2 | 5/2002 |

* cited by examiner

*Primary Examiner*—Lester Kincaid
*Assistant Examiner*—Matthew Sams
(74) *Attorney, Agent, or Firm*—Mintz, Levin, Cohn, Ferris, Glovsky, and Popeo, P.C.

(57) ABSTRACT

The present invention relates to a method and apparatus for scheduling data for transmission via at least two half-duplex time division multiple access connections, wherein for each connection respective capacities of data portions to a transmission frame are allocated so that the total capacity of all data portions of the transmission frame does not exceed a predetermined capacity for each transmission direction, and that the sum of capacities of data portions of each connection of the transmission frame in both transmission directions does not exceed the predetermined capacity. Then, the transmission timing of the data portions within the transmission frame is set in such a manner that transmission and reception intervals of each connection do not overlap. Accordingly, scheduling can be optimized to meet both QoS and half-duplex requirements.

15 Claims, 4 Drawing Sheets

```
1.   j = 1;
2.   while (true) {
3.       t = s_j^u;
4.       for ( i = |j|_n + 1; i != j; i = 1 + |i|_n ) {
5.           s_i^d = t ;
6.           f_i^d = |t + d_i|_T ;
7.           if ( |s_i^u − f_i^d|_T + u_i + d_i > T )
8.               break;
9.           t = f_i^d ;
10.      }
11.      if ( i == j ) {
12.          s_j^d = t ;
13.          f_j^d = |t + d_j|_T ;
14.          return j;
15.      }
16.      else
17.          j = 1 + |j|_n ;
18.  }
```

Fig. 7

SCHEDULING METHOD AND APPARATUS FOR HALF-DUPLEX TRANSMISSION

FIELD OF THE INVENTION

The present invention relates to a method and apparatus for scheduling data in a half-duplex transmission, which can be implemented e.g. in uplink and downlink burst data transmission for half-duplex terminals in burst-mode frequency division duplex (FDD) systems.

BACKGROUND OF THE INVENTION

Modern access systems support different higher layer protocols. Protocols define the format and order of messages exchanged between two or more communicating entities, as well as the actions taken on the transmission and/or receipt of a message or other event. The central purpose of the Medium Access Control (MAC) protocol is sharing of radio channel resources. The MAC protocol defines how and when an access point or subscriber unit may transmit on the channel. The MAC protocol includes the interface's procedures to provide guaranteed services to upper layers.

Wireless medium is a shared medium, which demands the MAC protocol to co-ordinate the transmission of multiple traffic flows over it. The basic distinction between different MAC protocols is the duplexing of the uplink and downlink channels. In Time Division Duplex (TDD), the downlink and uplink channels use the same carrier frequency. The data unit, i.e. MAC frame, is divided into an uplink portion and a downlink portion. The border between the uplink and downlink portion can be adaptive, which makes it suitable for asymmetric connections. In Frequency Division Duplex (FDD), different carrier frequencies are used in the downlink and uplink transmission. The terminals may thus simultaneously transmit and receive the signals. Finally, in Half-duplex Frequency Division Duplex (H-FDD), different carrier frequencies are used for the uplink and downlink transmission, but the terminals do not transmit and receive simultaneously. This poses a challenging problem to the uplink and downlink resource management. Furthermore, the type of physical channel has a significant influence on the radio access protocol and scheduling procedures. In a continuous transmission channel, the traffic flow is transmitted in the downlink direction and the whole traffic flow is received in the access point of the access network. The terminals have to decode the whole flow and pick up the packets addressed to them. In a Time Division Multiplexing (TDM) stream channel, the modulation type is changed within one MAC frame. The change has to be announced at the beginning of the MAC frame. The packets intended for various terminals have to be re-ordered according to the modulation type used by a particular terminal. In a Time Division Multiple Access (TDMA) burst channel, a standby mode is allowed when the data is not addressed to a particular terminal. The frame structure is announced at the beginning of the MAC frame.

An example of a wireless communication system, where FDD and a burst mode of transmission are adopted, and support of half-duplex terminal is required, is the air interface for the IEEE 802.16 fixed broadband wireless access system. In this burst-mode FDD system, the downlink channel is framed to allow adaptive modulation and forward error correction (FEC). To accommodate half-duplex terminals, the downlink channel uses TDMA or a mixture of TDM and TDMA, where TDM is utilized for bandwidth efficiency and TDMA is used for half-duplex terminal support. Furthermore, downlink and uplink burst transmissions are centrally scheduled on a frame-by-frame basis by a central controller or access point (AP), in order to meet specified quality of service (QoS) requirements. Scheduling deals with the manner in which queued data packets are selected for transmission on the respective link or channel. A downlink map message, transmitted at the beginning of each frame, broadcasts the frame layout to all other terminals in the system.

However, the QoS requirements can impose very tight constraints on the AP scheduler, which has to determine which packets to transmit next, and when, in order to meet system-defined QoS requirements. Similarly, half-duplex terminal transmission and reception scheduling imposes additional tight constraints which are independent of the QoS requirements. In particular, the burst data transmission order in each frame has to be arranged in such a manner that, for each of the half-duplex terminals, transmission and reception intervals do not overlap in time.

SUMMARY OF THE INVENTION

It is therefore an object of the present invention to provide a method and apparatus for scheduling data in a half-duplex transmission, by means of which both QoS and half-duplex constraints can be met.

This object is achieved by a method of scheduling data for transmission via at least two half-duplex time division multiple access connections, the method comprising the steps of:

allocating for each connection respective capacities of data portions of a transmission frame so that the total capacity of all data portions of the transmission frame does not exceed a predetermined capacity for each transmission direction, and that the sum of capacities of data portions of each connection of the transmission frame in both transmission directions does not exceed the predetermined capacity; and setting the transmission timing of the data portions within the transmission frame in such a manner that transmission and reception intervals of each connection do not overlap in time.

Furthermore, the above object is achieved by an apparatus for scheduling data for transmission via at least two half-duplex time division multiple access connections, said apparatus comprising:

allocation means for allocating for each connection respective capacities of data portions of a transmission frame so that the total capacity of all data portions of said transmission frame does not exceed a predetermined capacity for each transmission direction, and that the sum of capacities of data portions of each connection of said transmission frame in both transmission directions does not exceed said predetermined capacity; and setting means for setting the transmission timing of said data portions within said transmission frame in such a manner that transmission and reception intervals of each connection do not overlap in time.

Accordingly, scheduling can be optimised to meet both QoS and half-duplex requirements. The suggested scheduling procedure is optimal in the sense that it is always successful provided that the amount of capacity allocated in both transmission directions to a half-duplex terminal does not exceed the predetermined capacity, e.g. frame length. Furthermore, the number of data portions, e.g. bursts, transmitted in a frame can be minimized, thus minimizing the number of data portions for each transmission direction in a frame. Thereby, the number of entries in a transmission map provided for each transmission direction, e.g. uplink and downlink, can be minimized, while allowing to schedule transmissions according to whatever QoS model.

The predetermined capacity may correspond to the maximum amount of capacity, e.g. frame length, available in the transmission frame for both transmission directions.

It is to be noted that in the light of the present invention, the term "connection" should be interpreted in such a manner that each connection connects to a different terminal. Thus, an allocation for a connection also refers to a specific terminal. The connections may be wireless connections of a wireless communication system, wherein the transmission directions may be uplink and downlink directions.

The setting step comprises the steps of:
i) defining said set of capacity allocations for the one transmission direction of the transmission frame;
ii) setting an allocation start time for the other transmission direction of a subsequent connection, whose transmission timing directly follows a transmission timing of a selected reference connection, according to an allocation start time for the one transmission direction of the reference connection;
iii) setting an allocation start time for the other transmission direction of a non-subsequent connection, whose transmission timing does not directly follow the transmission timing of the selected reference connection, according to an allocation end time for the other transmission direction of a preceding connection, whose transmission timing directly precedes the transmission timing of the non-subsequent connection, and
iv) setting an allocation end time for said other transmission direction according to the sum of the set allocation start time and a value corresponding to the allocated capacity.

The steps ii) to iv) may be successively performed for each connection.

A connection whose transmission timing is the first timing within said transmission frame is initially selected as said reference connection, and wherein a connection with a subsequent transmission timing is selected if said scheduling does not lead to a feasible allocation. The feasibility may be checked by determining for each connection whether the sum of the total value of allocated capacities for that connection for both transmission directions and a capacity value corresponding to the difference between the set allocation start time for said one transmission direction and the set allocation end time for said other transmission direction is less then or equal to said predetermined capacity.

Furthermore, the capacities of said data portions may be determined based on respective quality requirements of said connections. The transmission frame may be a MAC frame.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

The preferred embodiment will now be described in greater detail based on an H-FDD scheduling scheme for scheduling uplink and downlink burst data transmission for half-duplex terminals or connections at an air interface of a fixed broadband wireless access (FBWA) system, e.g. according to the IEEE 802.16 specification.

Figure 1:
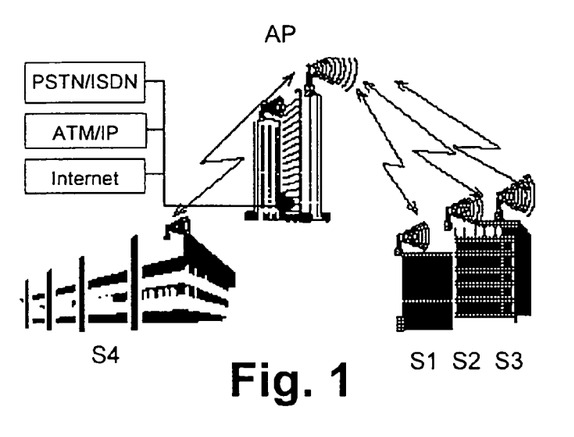
FIG. 1 shows a schematic diagram of a wireless communication system in which the present invention can be implemented.

FIG. 1 shows such an FBWA system, which comprises an access point AP, usually called base station (BS), and subscriber-stations (SS) S1 to S4. An SS can either be an individual end user terminal or a group terminal with several end user terminals connected to it. All data traffic goes through the access point AP, so that the access point AP can control the allocation of capacity (bandwidth) on the radio channel. The capacity is scheduled and allocated by the access point AP according to agreed traffic and/or QoS parameters.

Figure 2:
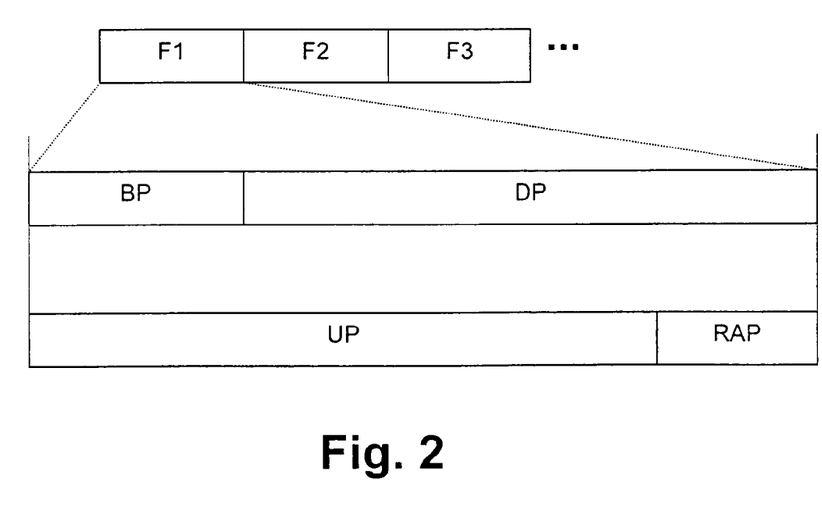
FIG. 2 shows a schematic diagram of an FDD based MAC protocol.

FIG. 2 shows an example of an FDD based MAC protocol. The downlink and uplink MAC frames F1 to F3 are of constant length. The downlink structure transmitted on a downlink carrier begins with a broadcast phase BP where information about uplink and downlink structure is announced. The broadcast phase BP is followed by a downlink phase DP for transmitting data bursts in the downlink direction. The uplink structure transmitted on an uplink carrier begins with an uplink phase UP for transmitting data bursts in the uplink direction, and is followed by a random access phase RAP primarily used for initial access but also for the signalling when a terminal has no resources allocated within the uplink phase UP.

In the following, a scheduling procedure according to the preferred embodiment for optimising uplink and downlink scheduling for half-duplex terminals or connections is described. The proposed procedure can be implemented in the access point AP or any other central controller of the communication system. Downlink and uplink bursts are simply characterized by their transmission duration, independently of the presence or absence of preambles and switching time gaps. The solution is sufficiently general to be adapted to many different systems, where TDM is also used for bandwidth efficiency, and the TDM portion needs to be ordered by burst robustness.

Figure 3:
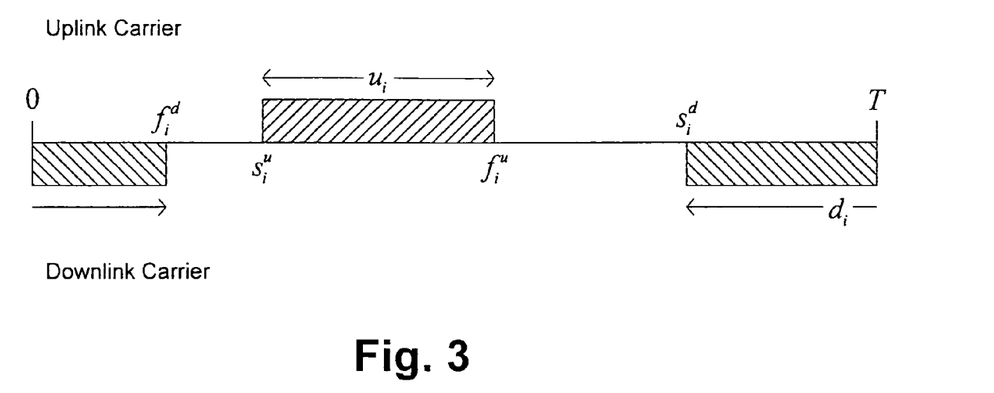
FIG. 3 shows a schematic diagram indicating notation of an uplink and downlink capacity allocation within a frame.

FIG. 3 shows a frame scheme indicating respective notations of a generic uplink and downlink capacity allocation for a terminal i, used in the following description of the scheduling procedure.

According to FIG. 3, $u_i$ is the amount of uplink capacity allocated to terminal i, $d_i$ is the amount of downlink capacity allocated to terminal i, T is the total amount of capacity available in the frame, both for uplink and downlink, $s_i^u$ is the time offset at which the uplink capacity allocation for terminal i starts, $s_i^d$ is the time offset at which the downlink capacity allocation for terminal i starts, and $f_i^u$ is the time offset at which the uplink capacity allocation for terminal i ends. The following relationship must hold for uplink capacity allocations:

$$f_i^u = |s_i^u + u_i|_T, \text{ i.e., } s_i^u = |f_i^u - u_i|_T \quad (1)$$

Furthermore, the following relationship must hold for downlink capacity allocations:

$$f_i^d = |s_i^d + d_i|_T, \text{ i.e., } s_i^d = |f_i^d - d_i|_T \quad (2)$$

wherein $f_i^d$ is the time offset at which the downlink capacity allocation for terminal i ends.

In the following, the term $(s_i^u, u_i)$ denotes the uplink capacity allocation for terminal i, and the term $(s_i^d, d_i)$ denotes the downlink capacity allocation for terminal i. The operator "$|\ |_T$" denotes a modulo operation with respect to the total amount T of capacity.

The conditions to be met for a feasible capacity allocation are as follows. A set $U=\{(s_i^u, u_i)\}$ ($D=\{(s_i^d, d_i)\}$) of uplink (downlink) capacity allocations is considered feasible if and only if, for any time instant $t \in [0,T]$, there exists only one capacity allocation $(s_j^u, u_j) \subseteq U$ $(s_j^d, d_j) \subseteq D$), if any, such that:

$$|t - s_j^u|_T < u_j (|t - s_j^d|_T < d_j). \quad (3)$$

In equation (3) states that a time instant is included between the start and the end of the capacity allocation for terminal j. The uniqueness of j implies that capacity allocations for different terminals do not overlap in time.

A set $U=\{(s_i^u, u_i)\}$ of uplink capacity allocations is feasible if and only if $$|s_i^u - f_j^u|_T + u_i + u_j \leq T, \forall i,j, \quad (4)$$

wherein:
1. $|s_i^u - f_j^u|_T$ is the time interval between the end of one allocation and the beginning of the other;
2. $u_i$ is the capacity allocated starting from $s_i^u$ onward, $u_j$ is the capacity allocated starting from $f_j^u$ backward;
3. in order that the two capacity allocations are not overlapping, the sum of the three must be not greater than T.

Figure 4:
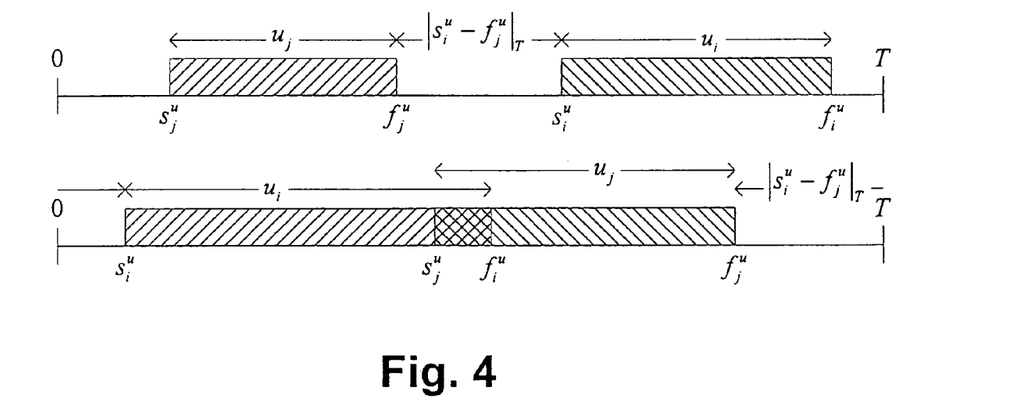
FIG. 4 shows a schematic diagram of specific allocation cases.

FIG. 4 shows a schematic diagram of specific cases for the above in equation (4). In the upper case, in equation (4) is true, while in the lower case in equation (4) is not true due to the overlapping uplink and downlink bursts.

A similar result can be stated for downlink allocations. A set $D=\{(s_i^d, d_i)\}$ of downlink capacity allocations is feasible if and only if $$|s_i^d - f_j^d|_T + d_i + d_j \leq T, \forall i,j. \quad (5)$$

As an additional feasibility condition, a pair of uplink $U=\{(s_i^u, u_i)\}$ and downlink $D=\{(s_i^d, d_i)\}$ capacity allocation sets is considered feasible if and only if, for any terminal i and time instant $t \in [0,T]$, such that $|t - s_i^u|_T < u_i$, it applies:

$$|t - s_i^d|_T \geq d_i. \quad (6)$$

Thus, uplink and downlink sets of capacity allocations are feasible if and only if uplink and downlink allocations for the same terminal do not overlap in time. A pair of uplink $U=\{(s_i^u, u_i)\}$ and downlink $D=\{(s_i^d, d_i)\}$ feasible capacity allocation sets is feasible if and only if $$|s_i^d - f_i^u|_T + u_i + d_i \leq T, \forall i. \quad (7)$$

In summary, the proposed scheduling procedure has to solve the following problem. Given a pair of uplink $U=\{(s_i^u, u_i)\}$ and downlink $D=\{(s_i^d, d_i)\}$ capacity allocation sets, the pair (U,D) is feasible if the in equations (4), (5) and (7) are all true.

Necessary conditions for the above in equations (4), (5), and (7) to be met can be immediately derived and are as follows:

1. $\Sigma u_i \leq T$;

2. $\Sigma d_i \leq T$;

3. $u_i + d_i \leq T, \forall i.$ \quad (8)

These conditions are also sufficient for a feasible pair of capacity allocation sets to exist.

It is assumed that $U=\{(s_i^u, u_i)\}$ is a feasible uplink capacity allocation set. Without losing generality, it is further assumed that indexes are assigned to terminals such that $i<j \Leftrightarrow s_i^u < s_j^u$, i.e., terminals are indexed by increasing uplink capacity allocation start time. Now, for a specific feasible downlink capacity allocation set $D=\{(s_i^d, d_i)\}$ the following must apply:

$$s_i^d = \begin{cases} \left| s_j^u + \sum_{k=j+1}^{i-1} d_k \right|_T & i > j \\ \left| s_j^u + \sum_{k=j+1}^{n} d_k + \sum_{k=1}^{i-1} d_k \right|_T & i \leq j \end{cases} \quad (9)$$

where j is a terminal index between 1 and n. For any feasible uplink capacity allocation set $U=\{(s_i^u, u_i)\}$, and for any set of $\{d_i\}$ satisfying conditions 2 and 3 of the condition set (8), there exists at least one j, such that the downlink capacity allocation set $D=\{(s_i^d, d_i)\}$, obtained by assigning offsets according to equation (9), is feasible when combined with U, i.e., (U,D) is a feasible pair of capacity allocation sets.

Figure 5:
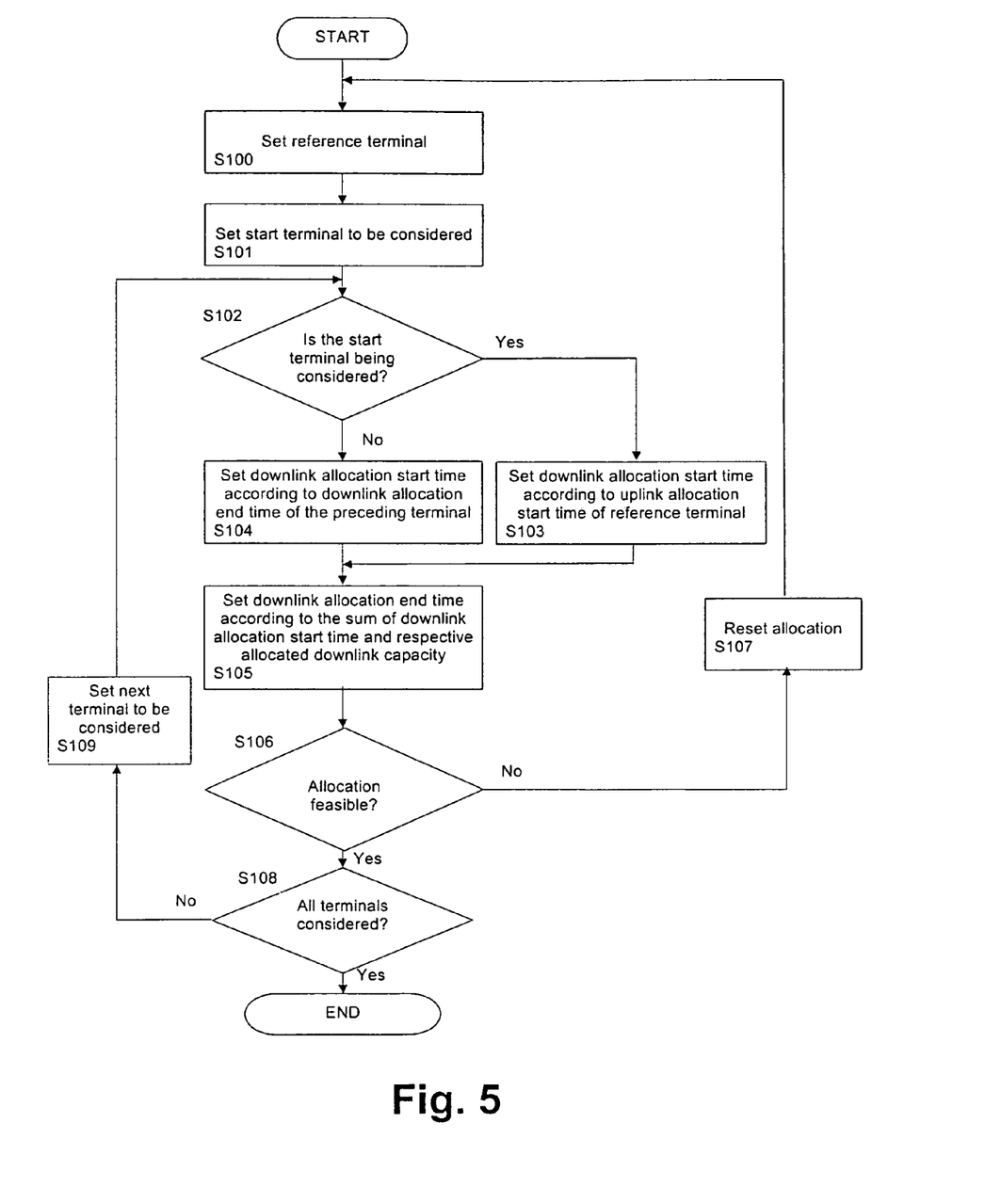
FIG. 5 shows a flow diagram of a scheduling procedure according to a preferred embodiment of the present invention.

FIG. 5 shows a flow diagram of a scheduling procedure based on the above allocation scheme defined in equation (9).

In the scheduling procedure, the following pre-conditions are considered to be met:
1. A set $U=\{(s_i^u, u_i)\}$ of uplink capacity allocations is defined. The set is feasible, i.e., capacity allocations for different terminals do not overlap in time. Any suitable scheduling algorithm, tailored to the system specific uplink QoS requirements, can be used.
2. Access terminals are identified by an index number ranging from 1 to n, such that $i<j \Leftrightarrow s_i^u < s_j^u$, i.e., by increasing uplink capacity allocation start time.
3. The amount of downlink capacity allocated for each terminal has been determined, i.e., the set of capacities $\{d_i\}$ is defined. The procedure by which the set has been determined can be any suitable scheduling algorithm, tailored to the system specific downlink QoS requirements.
4. The set of capacities $\{d_i\}$ is such that $\Sigma d_i \leq T$, and $u_i + d_i \leq T, \forall i$.

The proposed procedure is aimed at defining or setting the time offsets $\{s_i^d\}$, at which the downlink capacity allocations must start, so that the resulting downlink capacity allocation set $D=\{(s_i^d, d_i)\}$ is feasible when combined with u, i.e., (U,D) is a feasible pair of capacity allocation sets.

The scheduling operation can be detailed step-by-step according to the sequence of steps indicated in FIG. 5.

In step S100, the next terminal or connection j is set as a reference from which to start setting the capacity allocation starting offsets or times. The first time step S100 is performed, j=1 is set, i.e. the terminal or connection with the first or earliest allocation start time is set as the reference terminal, while the next times $j=1+|j|_n$ is set.

Based on the choice of the reference terminal made in step S100, it is verified if the corresponding downlink allocation is feasible. This is accomplished as follows. A subsequent start terminal $i=|j|_n + 1$ to be considered first is determined in step S101, and going on considering one terminal at a time by increasing index (modulus n, i.e., the index after n is 1), the following operations are performed. In step S102, it is checked whether the considered terminal is the start terminal, i.e. $i=|j|_n + 1$. The downlink allocation starting offset of terminal i is then set as follows. If $i=|j|_n + 1$, i.e. the answer in step S102 is "yes", then the downlink allocation start time or offset is set according to the uplink allocation start time or offset of the reference terminal, e.g. $s_i^d = s_j^u$. Otherwise, if the answer in step S102 is "no", then the downlink allocation start time or offset is set according to the uplink allocation end time or offset of the preceding terminal, e.g. $s_i^d = f_{i-1}^d$.

Then, in step S105, the downlink capacity end time of the considered terminal i is set according to the sum of the downlink allocation start time and the respective downlink capacity allocated to the considered terminal, e.g. $f_i^d = |s_i^d + d_i|_T$. It is noted that, by determining the allocation according to this formula, it could happen that the allocation wraps around the end of the frame and, in this case, two different allocations to the same terminal are actually defined, one at the end and the other at the beginning of the frame, respectively. However, this can happen for at most one terminal per frame.

In step S106, it is checked whether the obtained allocation for the considered terminal or connection is feasible. As an example, the overall current allocation can be tested or checked according to the following calculation based on (7). If $|s_i^u - f_i^d|_T + u_i + d_i > T$, the terminal j selected in step S100 is not suitable. Then, the answer in step S106 is "no" and the current allocation procedure is stopped and reset in step S107, wherein the allocated downlink capacity starting times or offsets are deleted. Furthermore, the procedure returns to step S100 so as to select the next reference terminal.

Otherwise, if the answer in step S106 is "yes", i.e. the allocation defined for terminal i is fine. Then, it is checked in step S108 whether all terminals have been considered, i.e. i=j. If so, all of the downlink capacity allocation starting times or offsets have been set successfully. The scheduling procedure has finished and the resulting set $D=\{(s_i^d, d_i)\}$ gives the optimized downlink capacity allocation.

Otherwise, if there are still terminals to be considered, the next terminal must be considered. To achieve this, the next terminal is set in step S109, $i=1+|i|_n$, and the procedure returns to step S102.

By referring to the procedure illustrated above, it can be stated that the procedure for optimal downlink allocation consists of searching for a downlink capacity allocation set where allocation start times are determined as a function of the set of downlink capacities and the set of uplink capacity allocations, according to equation (9). The suggested procedure implements a linear search by increasing the index of the reference terminal, i.e. the value of j, starting from j=1, and verifying whether the corresponding downlink allocation set resulting from equation (9), combined with the uplink allocation set U, is feasible or not.

Figure 6:
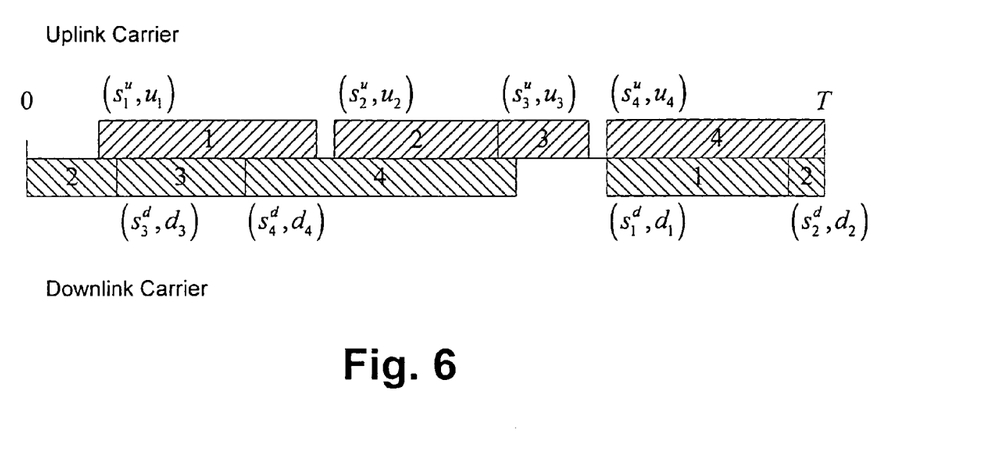
FIG. 6 shows a schematic diagram indicating a feasible allocation.

FIG. 6 shows an example of a feasible pair, where the downlink allocation set D was obtained according to equation (9) with j=4. As can be gathered from FIG. 6, the allocation start times or offsets of the downlink data bursts 1 to 4 are arranged in such a manner that no downlink data burst overlaps with a corresponding uplink data burst of the same terminal or connection. The downlink data burst 2 has been split up at the end and the start of the frame due to the modulo operation with respect to the maximum capacity value of the frame.

Figure 7:
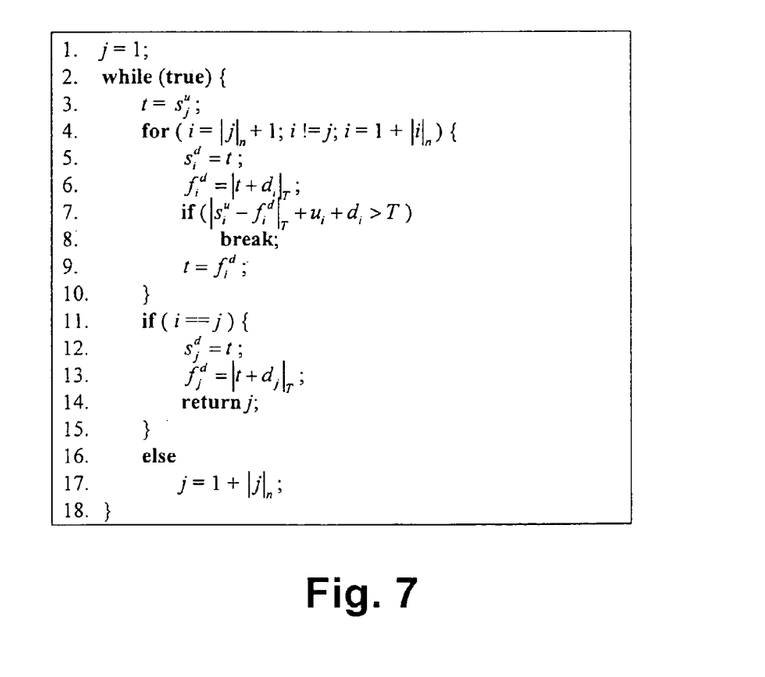
FIG. 7 shows a pseudo-code implementation example of the scheduling procedure according to the preferred embodiment.

FIG. 7 shows a pseudo-code example for a software routine for controlling a scheduling function at the access point AP or another central controller of the communication system. This pseudo-code routine corresponds to a specific implementation example of the procedure indicated in FIG. 5 when using equation (9).

It is noted that the present invention is not restricted to the preferred embodiment described above, but can be used in any scheduling function for scheduling data portions to be allocated to transmission frames of half-duplex connections. In particular, the present invention is not restricted to the specific use of an initial preset uplink allocation. As an alternative, a downlink allocation may be preset, based on which uplink allocation start times and end times are determined. In general, one transmission direction can be scheduled based on the other transmission direction. Thus, the preferred embodiments may vary within the scope of the attached claims.

The invention claimed is:

1. A method, comprising:

allocating for each connection respective capacities of data portions to a transmission frame so that, for each transmission direction, a total capacity of all data portions of the transmission frame does not exceed a predetermined capacity, and that a sum of capacities of the data portions of each connection of the transmission frame in both transmission directions does not exceed the predetermined capacity, wherein each connection is configured to connect to a different terminal device; and setting a transmission timing of the data portions within the transmission frame at each connection in such a manner that transmission and reception intervals of each connection do not overlap in time to schedule data for transmission via at least two half duplex time division multiple access connections, wherein setting the transmission timing further comprises:
  selecting a reference terminal from a plurality of terminal devices;
  allocating, for one of the plurality of terminal devices, a downlink interval defined by a downlink start time and a downlink end time according to an uplink start time of the reference terminal; and
  resetting the downlink interval and selecting a different reference terminal, when the downlink interval overlaps an uplink interval defined by an uplink start time and an uplink end time of the one of the plurality of terminal devices; and wherein setting the transmission timing further comprises:
  determining allocation start times based on a set of capacity allocations of one transmission direction and a set of capacities of the other transmission direction;
  defining said set of capacity allocations for the one transmission direction of the transmission frame;
  setting an allocation start time for the other transmission direction of a subsequent connection, whose transmission timing directly follows a transmission timing of a selected reference connection, according to an allocation start time for the one transmission direction of the selected reference connection;
  setting an allocation start time for the other transmission direction of a non-subsequent connection, whose transmission timing does not directly follow said transmission timing of the selected reference connection, according to an allocation end time for the other transmission direction of a preceding connection, whose transmission timing directly precedes the transmission timing of the non-subsequent connection; and
  setting an allocation end time for the other transmission direction according to a sum of the set allocation start time and a value corresponding to the allocated capacity.

2. A method according to claim 1, wherein the predetermined capacity corresponds to a maximum amount of capacity available in the transmission frame for both transmission directions.

3. A method according to claim 1, wherein the connections are wireless connections of a wireless communication system, and wherein the transmission directions are uplink and downlink directions.

4. A method according to claim 1, wherein setting the transmission timing is based on the equation:

$$s_i^d = \begin{cases} \left| s_j^u + \sum_{k=j+1}^{i-1} d_k \right|_T & i > j \\ \left| s_j^u + \sum_{k=j+1}^{n} d_k + \sum_{k=1}^{i-1} d_k \right|_T & i \leq j \end{cases}$$

where j is a terminal index between 1 and n, $d_k$ is the amount of downlink capacity allocated to terminal k, T is the total amount of capacity, available in the frame, both for uplink and downlink, $S_i^u$ is the time offset at which the uplink capacity allocation for terminal i starts, and $S_i^d$ is the time offset at which the downlink capacity allocation for terminal i starts.

5. A method according to claim 1, wherein setting the allocation start time for the other transmission direction of the subsequent connection, setting the allocation start time for the other transmission direction of the non-subsequent connection, and setting the allocation end time for the other transmission direction according to the sum of the set allocation start time and the value corresponding to the allocated capacity are successively performed for each connection.

6. A method according to claim 1, wherein a connection whose transmission timing is the first timing within the transmission frame is initially selected as the selected reference connection, and wherein a connection with a subsequent transmission timing is selected if a scheduling does not lead to a feasible allocation.

7. A method according to claim 6, wherein the feasible allocation is checked by determining for each connection whether the sum of the total value of allocated capacities for that connection for both transmission directions and a capacity value corresponding to the difference between the set allocation start time for the one transmission direction and the set allocation end time for the other transmission direction is less than or equal to the predetermined capacity.

8. A method according to claim 1, wherein the capacities of the data portions are determined based on respective quality requirements of the connections.

9. A method according to claim 1, wherein the transmission frame is a medium access control frame.

10. An apparatus, comprising:
allocation means for allocating for each connection respective capacities of data portions of a transmission frame so that, for each transmission direction, a total capacity of all data portions of the transmission frame does not exceed a predetermined capacity and that a sum of capacities of data portions of each connection of the transmission frame in both transmission directions does not exceed said predetermined capacity, wherein each connection is configured to connect to a different terminal device; and
setting means for setting a transmission timing of the data portions within the transmission frame at each connection in such a manner that transmission and reception intervals of each connection do not overlap in time to schedule data for transmission via at least two half duplex time division multiple access connections,
wherein setting the transmission timing further comprises:
selecting a reference terminal from a plurality of terminal devices;
allocating, for one of the plurality of terminal devices, a downlink interval defined by a downlink start time and a downlink end time according to an uplink start time of the reference terminal; and
resetting the downlink interval and selecting a different reference terminal, when the downlink interval overlaps an uplink interval defined by an uplink start time and an uplink end time of the one of the plurality of terminal devices; and
wherein setting the transmission timing further comprises:
determining allocation start times based on a set of capacity allocations of one transmission direction and a set of capacities of the other transmission direction;
defining said set of capacity allocations for the one transmission direction of the transmission frame;
setting an allocation start time for the other transmission direction of a subsequent connection, whose transmission timing directly follows a transmission timing of a selected reference connection, according to an allocation start time for the one transmission direction of the selected reference connection;
setting an allocation start time for the other transmission direction of a non-subsequent connection, whose transmission timing does not directly follow said transmission timing of the selected reference connection, according to an allocation end time for the other transmission direction of a preceding connection, whose transmission timing directly precedes the transmission timing of the non-subsequent connection; and
setting an allocation end time for the other transmission direction according to a sum of the set allocation start time and a value corresponding to the allocated capacity.

11. An apparatus, comprising:
an access point configured to allocate for each connection respective capacities of data portions of a transmission frame so that, for each transmission direction, a total capacity of all data portions of the transmission frame does not exceed a predetermined capacity, and that a sum of capacities of data portions of each connection of the transmission frame in both transmission directions does not exceed the predetermined capacity, wherein each connection is configured to connect to a different terminal device, and configured to set a transmission timing of the data portions within the transmission frame at each connection in such a manner that transmission and reception intervals of each connection do not overlap in time to schedule data for transmission via at least two half duplex time division multiple access connections,
wherein setting the transmission timing further comprises:
selecting a reference terminal from a plurality of terminal devices;
allocating, for one of the plurality of terminal devices, a downlink interval defined by a downlink start time and a downlink end time according to an uplink start time of the reference terminal; and
resetting the downlink interval and selecting a different reference terminal, when the downlink interval overlaps an uplink interval defined by an uplink start time and an uplink end time of the one of the plurality of terminal devices; and wherein setting the transmission timing comprises:
determining allocation start times based on a set of capacity allocations of one transmission direction and a set of capacities of the other transmission direction, wherein the setting comprises;
defining said set of capacity allocations for the one transmission direction of the transmission frame;
setting an allocation start time for the other transmission direction of a subsequent connection, whose transmission timing directly follows a transmission timing of a selected reference connection, according to an allocation start time for the one transmission direction of the selected reference connection;
setting an allocation start time for the other transmission direction of a non-subsequent connection, whose transmission timing does not directly follow said transmission timing of the selected reference connection, according to an allocation end time for the other transmission direction of a preceding connection, whose transmission timing directly precedes the transmission timing of the non-subsequent connection; and
setting an allocation end time for the other transmission direction according to a sum of the set allocation start time and a value corresponding to the allocated capacity.

12. An apparatus according to claim 1, wherein the connections are configured to connect to half-duplex terminals at an air interface of a wireless communication system.

13. An apparatus according to claim 12, wherein the air interface corresponds to an IEEE 802.16 specification.

14. An apparatus according to claim 11, wherein the apparatus is a central controller or an access point of a wireless communication system.

15. A computer program embodied on a computer readable storage medium, the computer program being configured to control a processor to perform a process comprising:
allocating for each connection respective capacities of data portions to a transmission frame so that, for each transmission direction, a total capacity of all data portions of the transmission frame does not exceed a predetermined capacity, and that a sum of capacities of the data portions of each connection of the transmission frame in both transmission directions does not exceed the predetermined capacity, wherein each connection is configured to a different terminal device; and
setting a transmission timing of the data portions within the transmission frame at each connection in such a manner that transmission and reception intervals of each connection do not overlap in time to schedule data for transmission via at least two half duplex time division multiple access connections, wherein setting the transmission timing further comprises:
selecting a reference terminal from a plurality of terminal devices;
allocating, for one of the plurality of terminal devices, a downlink interval defined by a downlink start time and a downlink end time according to an uplink start time of the reference terminal; and
resetting the downlink interval and selecting a different reference terminal, when the downlink interval overlaps an uplink interval defined by an uplink start time and an uplink end time of the one of the plurality of terminal devices; and wherein setting the transmission timing further comprises:
determining allocation start times based on a set of capacity allocations of one transmission direction and a set of capacities of the other transmission direction;
defining said set of capacity allocations for the one transmission direction of the transmission frame;
setting an allocation start time for the other transmission direction of a subsequent connection, whose transmission timing directly follows a transmission timing of a selected reference connection, according to an allocation start time for the one transmission direction of the selected reference connection;
setting an allocation start time for the other transmission direction of a non-subsequent connection, whose transmission timing does not directly follow said transmission timing of the selected reference connection, according to an allocation end time for the other transmission direction of a preceding connection, whose transmission timing directly precedes the transmission timing of the non-subsequent connection; and
setting an allocation end time for the other transmission direction according to a sum of the set allocation start time and a value corresponding to the allocated capacity.

* * * * *